D. A. BRUNETT.

HOT AIR FURNACE.

APPLICATION FILED NOV. 14, 1921.

Reissued June 6, 1922.

15,372.

2 SHEETS—SHEET 1.

INVENTOR.
DEWITT A. BRUNETT.
BY HIS ATTORNEY.
James F. Williamson

D. A. BRUNETT.

HOT AIR FURNACE.

APPLICATION FILED NOV. 14, 1921.

Reissued June 6, 1922.

15,372.

2 SHEETS—SHEET 2.

INVENTOR.
DEWITT A. BRUNETT.
BY HIS ATTORNEY.
James F. Williamson

UNITED STATES PATENT OFFICE.

DEWITT A. BRUNETT, OF MINNEAPOLIS, MINNESOTA.

HOT-AIR FURNACE.

15,372. Specification of Reissued Letters Patent. Reissued June 6, 1922.

Original No. 1,392,888, dated October 4, 1921, Serial No. 358,813, filed February 16, 1920. Application for reissue filed November 14, 1921. Serial No. 515,132.

*To all whom it may concern:*

Be it known that I, DEWITT A. BRUNETT, a citizen of the United States, residing at Minneapolis, in the county of Hennepin and State of Minnesota, have invented certain new and useful Improvements in Hot-Air Furnaces; and I do hereby declare the following to be a full, clear, and exact description of the invention, such as will enable others skilled in the art to which it appertains to make and use the same.

My invention relates to hot air furnaces for heating systems and has for its object to improve the same in point of efficiency, economy and control of the distribution of the heat, to wit: the hot air, to the different rooms of a building.

Generally stated, the invention consists of the novel devices and combinations of devices hereinafter described and defined in the claims.

The invention is illustrated in the accompanying drawings wherein like characters indicate like parts throughout the several views.

Referring to the drawings.

Figure 1:
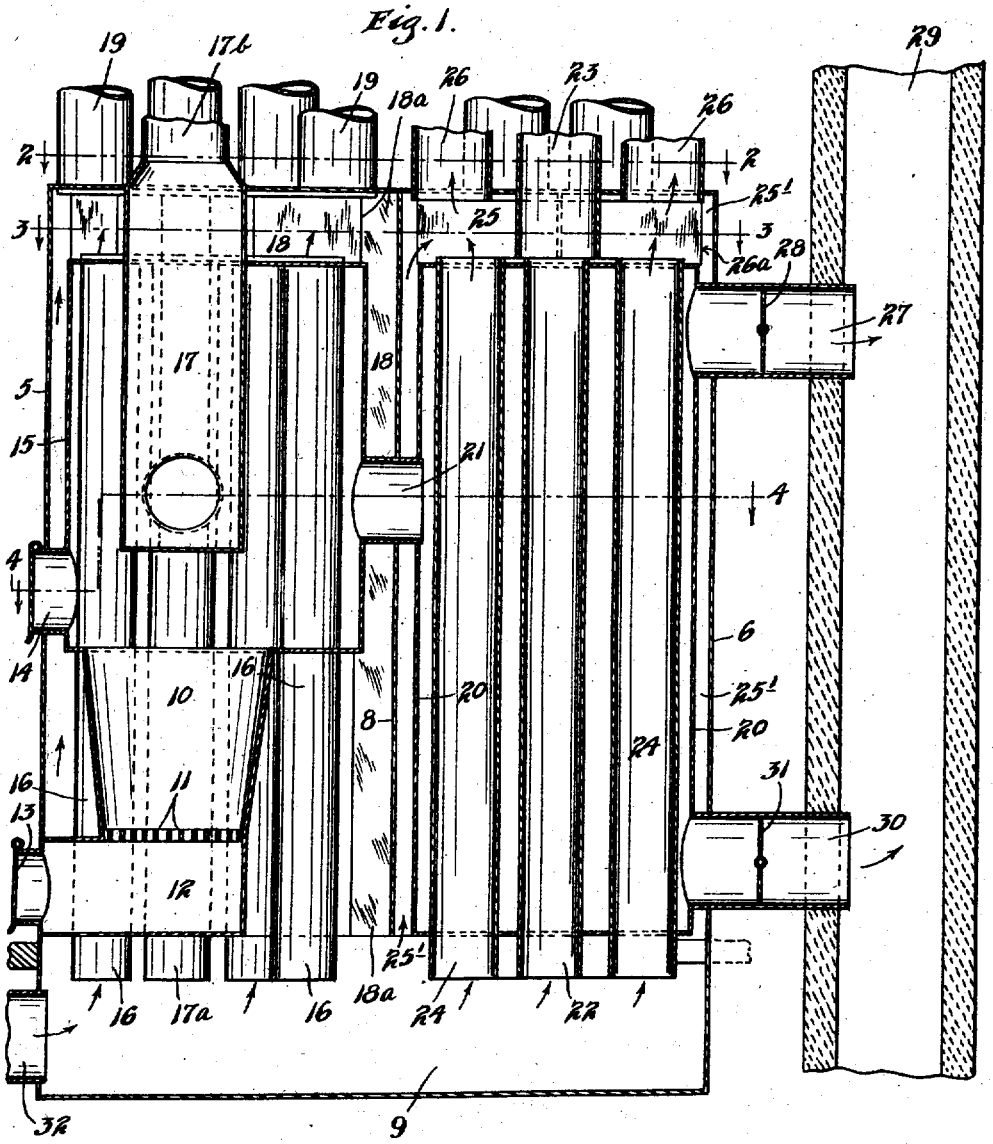
Fig. 1 shows the improved furnace in vertical section on the line 1—1 of Fig. 2.
Figure 2:
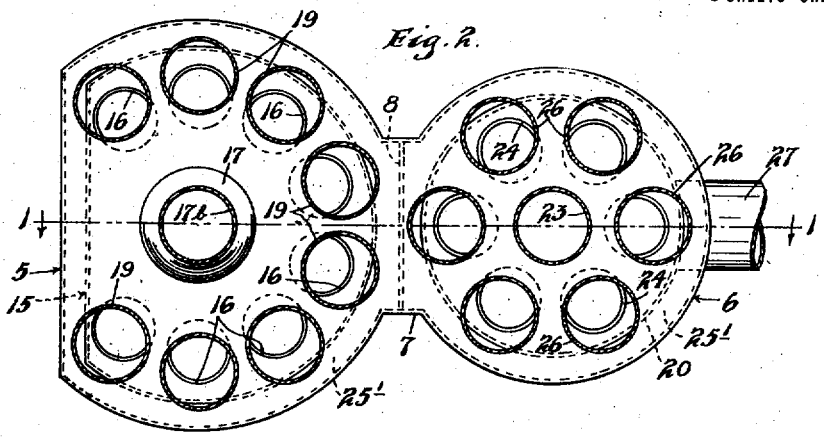
Fig. 2 is a horizontal section on the line 2—2 of Fig. 1.
Figure 3:
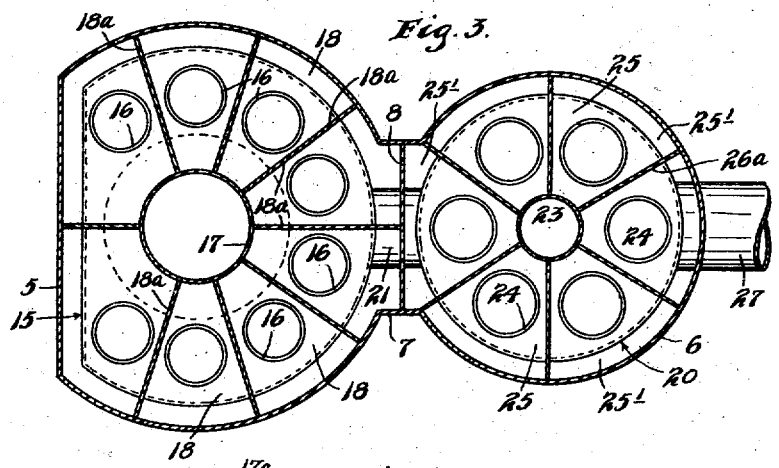
Fig. 3 is a horizontal section on the line 3—3 of Fig. 1.

As preferably constructed, the furnace comprises two enclosing shells 5 and 6 herein designated as the primary and secondary shells or casings, and these two shells are joined at 7, but separated by a partition 8. The tops of the two shells 5 and 6 are closed, except for hot air delivery pipes hereinafter noted, but their lower ends open into a common base 9.

Suitably secured within the main or primary shell 5 is a suitable fire pot 10 having a grate 11, and below the grate an ash pit 12. A door-equipped opening 13 leads through the shell 5 into the ash pit 12, and a door-equipped opening 14 extends through the front of the shell 5 and opens into a primary combustion chamber formed within a metal drum or shell 15.

The drum 15 is spaced from the walls of the shell 5, its lower head is connected to the top of the fire pot 10, and its upper head is spaced from the upper head of said shell 5.

A plurality of circumferentially spaced hot air tubes 16 extend through the drum or primary combustion chamber 15 and extend down to points below the ash pit 12, but terminate above the bottom of the base air chamber 9. The numeral 17 indicates a tubular air chamber that is extended downward through the upper head of the shells 5 and 15, is located axially over the fire pot 10 and has a closed head at its lower end that is located quite a distance above the top of the fire pot. A hot air tube $17^a$ extends downward from one side of the central chamber 17 and terminates above the bottom of the base air chamber 9, much like the tube 16. A hot air pipe $17^b$ extends from the top of the central chamber 17 to one of the rooms of the house or building.

Figure 4:
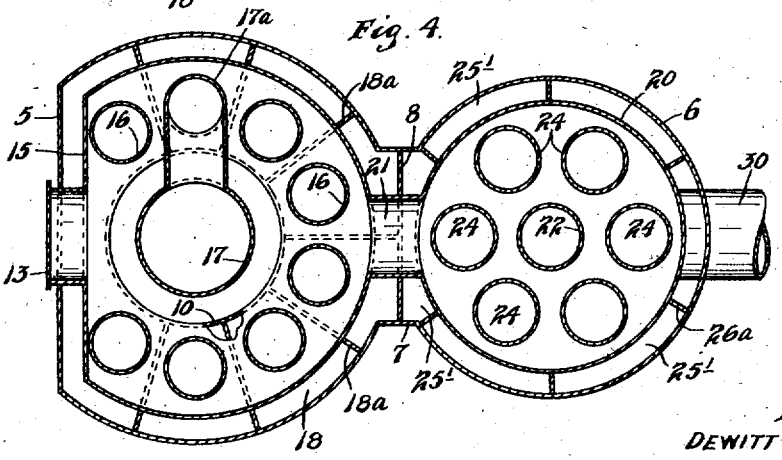
Fig. 4 is a horizontal section on the irregular line 4—4 of Fig. 1.

The space above the upper head of the inner shell or combustion chamber 15 and the upper head of the outer shell 5 is divided into a plurality of so-called air pockets 18, by radial partitions $18^a$ that extend from the central air chamber 17 to the outer shell 5. These partitions $18^a$ also extend down through the annular space between the shells 5 and 15, and, below the shell 15, are extended inward against the fire pot 10 and ash pit 12 and terminate, preferably, in line with the bottom of said ash pit, (note particularly Figs. 1 and 4). There is thus formed a pocket 18 located immediately above the upper end of each air tube 16 and a vertical passage or space 18′ extends from each of these pockets between the partitions $18^a$ downwardly around the hot air chamber and to the bottom thereof, which bottom, as shown in Fig. 1, is in alignment with the bottom of the ash pit 12. The said air tubes 16, to distinguish them from other and similar tubes hereinafter described, may be treated as the primary air tubes.

Each pocket 18 is thus in communication with the upper end of one of the air tubes 16 and also is in communication with the base air chamber 9 through the outer air passages 18′. Extended upward through the top of the shell 5, one from each of the pockets 18, is a hot air pipe 19. These pipes 19 will extend to different rooms, or to different parts of the same room, and to distinguish the same from similar pipes to be hereinafter described, they may be designated as the primary air pipes.

Located within the secondary shell or casing 6 is an inner shell or drum 20 which is spaced from the sides and top of said outer shell 6 and from the bottom of the base air chamber 9. This inner shell 20 affords what may be designated as a secondary combustion chamber or chamber for the hot gases and products of combustion; and here it should be noted that the primary combustion chamber 15 and this secondary combustion chamber 20 are connected at their intermediate portions by a short primary smoke pipe 21 (see Figs. 1 and 4). The secondary combustion chamber or shell 20 is longer than the primary combustion chamber 15 and extends down, preferably, as far as the bottom of the partition 18[a].

A central hot air tube 22 extends axially through the inner shell 20 and, at its upper end, is connected to a hot air pipe 23 that extends through the top of the shell 6 and to one of the rooms of the building. Circumferentially spaced secondary air tubes 24 also extend completely through the inner shell 20. The space between the tops of the shells 6 and 20 is divided into a plurality of so-called secondary air pockets 25, by means of radial partitions 26 that extend from the lower portion of the air pipe 23 to the walls of the shell 6, and down to the bottom of the secondary shell 20. Here also is a pocket 25 in communication with each of the secondary air tubes 24, and also with the base air chamber 9 through outer air passageways 25. Secondary hot air pipes 26 extend from the top of the shell 6 and lead, one from each of the air pockets 25, either to different rooms or to different parts of the same room (see Fig. 1).

An upper secondary smoke pipe 27 equipped with a damper 28 leads from the top of the inner shell or secondary combustion chamber 20 to a chimney or stack 29 and a similar lower secondary smoke pipe 30 leads from the lower portion of said shell 20 into the smoke stack or chamber 29 and is provided with a damper 31. One, or more, usually several, cold air return pipes 32 from the room or rooms will extend to and open into the common base air chamber 9 of the hot air furnace.

*Operation.*

When the furnace is in operation, the primary combustion from the fire pot will, of course, take place in the primary combustion chamber 15, and the greatest heat will be produced therein, but the burning flames or products of combustion will pass into the secondary combustion chamber 20, and from thence, to a smoke stack or chimney. In starting a fire, the lower damper 31 may be closed and the upper damper 28 will be open, so as to get a stronger draught through the upper secondary smoke pipe 27; but after the fire has been started, the upper damper 28 will be closed and the lower damper 31 opened, so as to thereby obtain the greatest effect of the heat from the hot gases within the secondary combustion chamber. Thus, the maximum amount of heat is obtained from the combustion, and the products of the combustion are delivered to the smoke stack or chimney only in such warm condition as to insure good draught.

As to the action of the air, the cold air may be drawn into the base air chamber 9, either directly from the basement, or from the outside of the building, or through cold air return pipes from the several rooms, but in any event, will be evenly distributed to the lower ends of the several air tubes 16, 17[a], 22, 24, 18[b], and 25[a], and in passing upward through said air tubes and air pockets, the air will, of course, be heated.

Here it is important to note that the air delivered to the two tubes that lead to any one of the primary or secondary air pockets, will be heated and positively delivered to that particular pocket, and from the said pocket to the particular air pipe that leads therefrom to the room or to the particular place in the room. Otherwise stated, after the air heating process has commenced there is no chance for recommingling of the air that is to be delivered to different rooms or to different parts of the same room, and thus there is insured the proper proportionate delivery of air to the several places where it is intended that it should go in order to properly heat a house or building.

Particular attention is also directed to the fact that the shells 5 and 6 are entirely separated. A certain amount of heat is extracted from the products of combustion in shell 5, and the products then pass into chamber 20. All radiation of heat from chamber 20 will thus be conserved in shell 6. The chambers at the top of shells 5 and 6, respectively, are, of course, likewise, separated and the temperatures in these chambers will be different. This is important, for if the top of shell 5 were connected to the top of shell 6 the hotter gases from 5 would tend to flow out of the pipes 26 and influence the flow of air through pipes 24.

It will be obvious from the above disclosure that the cross sectional area of the space in the shells 15 and 20 between the pipes 16, 17[a], 22 and 24, is greater than the total cross sectional area of the said pipes. This structure differs from the furnaces of the prior art in which the cross sectional area of the warm air passage is greater than the passage for the products of combustion. With applicant's structure, therefore, the ratio of velocity or volume of flow of the warm air and combustion products will be comparatively low or, in other words, the warm air will move faster, and the combustion products slower. With this result, more cold air will be passed in contact with the surfaces heated with the products of combustion and more heat extracted therefrom. It is the purpose of the present invention to circulate a large quantity of air through the rooms to be heated.

Aside from the advantages as to the proper delivery of air, this hot air furnace obtains a maximum amount of heat from the fuel consumed and delivers the gases or products of combustion to the chimney or stack only in such warm condition as is necessary to insure good draught.

What is claimed is:

1. In a hot air furnace, the combination with an outer primary casing and a secondary outer casing, said two casings having a common base air chamber, of primary and secondary drums respectively within said primary and secondary casings spaced therefrom at the sides, top and bottom, and affording, respectively, primary and secondary combustion chambers, the said two combustion chambers being connected for the passage of hot gases from the former to the latter, primary and secondary air pockets formed, respectively, over the tops of said primary and secondary combustion chambers, primary and secondary hot air tubes extending, respectively, through said primary and secondary combustion chambers and connecting with the air chamber in the base and with the air pockets, and primary and secondary hot air pipes extending, respectively, from said primary and secondary air pockets.

2. In a hot air furnace, the combination with an outer primary casing and a secondary outer casing, said two casings having a common base air chamber, of primary and secondary drums, respectively, within said primary and secondary casings spaced therefrom at the sides, top and bottom and affording, respectively, primary and secondary combustion chambers, a connection between the two combustion chambers for the passage of the hot gases from the former to the latter, primary and secondary air pockets formed, respectively, over the tops of said primary and secondary combustion chambers, primary and secondary hot air tubes extending, respectively, through said primary and secondary combustion chambers and connecting with the air chamber in the base and with the air pockets, the spaces between the sides of said primary and secondary combustion chambers and their surrounding casings being divided into outer hot air chambers that lead to the primary and secondary air pockets, and primary and secondary hot air pipes leading, respectively, from said primary and secondary air pockets.

3. In a hot air furnace, the combination with an outer casing having a lower air chamber and an inner drum, the latter constituting a combustion chamber, of a fire pot below and opening into said combustion chamber, an ash pit below said fire pot, the bottom of which is spaced above the bottom of the outer casing, said drum being spaced from said casing at its sides and top, means forming air pockets between the top of said drum and the top of the casing, said means extending downwardly between the sides of the drum and casing to a point in alignment with the bottom of the ash pit, a drum comprising a closed cylinder extending downwardly into said first mentioned drum and forming a hot air chamber, a hot air pipe leading from the top of the second mentioned drum and a pipe leading from the lower portion thereof and communicating with the lower air chamber of the outer casing, air pipes leading from said air pockets and conduits communicating with the inner casing forming the combustion chamber at the front and rear thereof, the conduit at the front having a hinged closure thereon and the conduit at the rear forming a smoke passage.

4. The combination with a furnace comprising a fire pot, combustion chamber and ash pit and a smoke passage leading from the combustion chamber, of a heating device comprising an outer casing having an air chamber at the base thereof, an inner casing spaced therefrom at the top, sides and bottom with which said smoke passage communicates, means forming air pockets between the tops of the inner and outer casings, an open ended tube connecting the air chamber at the bottom of the outer casing with a space between the tops of said casings, a hot air pipe leading from the top of said tube, open ended tubes surrounding the first mentioned tube and connecting the air chamber at the bottom of the outer casing with the air pockets formed at the top of the inner casing, hot air tubes leading from said air pockets, a smoke pipe leading from the upper portion of said inner casing adapted to lead to a chimney and having a damper therein, and a smoke pipe leading from the bottom of said inner casing adapted to lead to the chimney and having a damper therein, the damper in the upper smoke pipe being adapted to be opened only when the fire in the furnace is started and the damper in the lower smoke pipe being adapted to be opened during the normal operation of the furnace.

5. The combination with a furnace comprising a fire pot, combustion chamber and ash pit and a smoke passage leading from the combustion chamber, of a heating device comprising an outer casing having an air chamber at the base thereof, an inner chamber spaced therefrom at the top, sides and bottom with which said smoke passage communicates, means forming air pockets between the tops of the inner and outer casings, a plurality of open ended tubes connecting the air chamber at the bottom of the outer casing with said air pockets formed at the top of the inner casing, hot air tubes leading from said air pockets, a smoke pipe leading from the upper portion of said inner casing adapted to lead to a chimney and having a damper therein and a smoke pipe leading from the bottom of said inner casing adapted to lead to the chimney and having a damper therein, the damper for the upper smoke pipe being adapted to be opened only when the fire in the furnace is started and the damper in the lower smoke pipe being adapted to be opened during the normal operation of the furnace.

6. A hot air furnace comprising two separate casings, a primary combustion chamber surrounded by one casing, a secondary combustion chamber surrounded by the other casing, a series of pockets formed between the top of each of said casings and said combustion chambers, a common base air chamber beneath said casings and separate conduits connecting said latter chamber to the pockets of both of said series.

7. A hot air furnace having in combination, a primary combustion chamber, a casing surrounding the same, a secondary combustion chamber, a casing surrounding the same and separated from said first mentioned casing, a conduit connecting said combustion chambers, a common base air chamber extending below said casings and conduits communicating at their lower ends with said base air chamber and passing through the respective combustion chambers and opening, respectively, into said casings above said combustion chambers.

8. A hot air furnace having in combination, a primary combustion chamber, a casing surrounding the same, a secondary combustion chamber, a casing surrounding the same and separated from said first mentioned casing, a conduit connecting said combustion chambers, and conduits leading from the top of each of said casings above the combustion chambers therein.

9. In a hot air furnace, comprising a fire pot, an ash pit below the same, a casing forming a combustion chamber above and communicating with said fire pot, a shell surrounding the casing and fire pot and spaced from said casing at the top, a cylindrical member projecting into said casing from the top, a plurality of open-ended conduits passing through said casing and communicating with said space at the top of the same, a conduit communicating with said cylindrical member adjacent the bottom thereof and passing through the lower end of said shell, and a conduit leading from the upper end of said cylindrical member through the top of the shell.

10. A heating device comprising two separate chambers, a casing forming a common cold air chamber below the same, one chamber surrounding a furnace having a fire pot and primary combustion chamber, and the other chamber surrounding a secondary combustion chamber, and a conduit connecting the two combustion chambers.

11. The structure set forth in claim 10, and conduits adjacent the top and bottom of said secondary combustion chamber disposed oppositely to said first mentioned conduit, and adapted to connect the same to a chimney.

12. A hot air furnace having in combination, a fire pot, a combustion chamber above the same and communicating therewith, an ash pit below the fire pot, a casing surrounding said combustion chamber and spaced therefrom at the sides, top and bottom, an air chamber below said ash pit and said casing, open ended conduits leading from said air chamber through the combustion chamber to the space between the same and the top of the casing, and radial partitions dividing the space between the combustion chamber, fire pot and ash pit and said casing into air pockets with the upper end of which said conduits communicate.

13. A heating system comprising a primary combustion chamber, hot-air chambers thereabove, a secondary combustion chamber of larger volume connected thereto, hot air chambers above said secondary combustion chamber separated from said first mentioned hot air chambers, a cold air chamber located below said combustion chambers, conduits of less cross sectional area than the primary combustion chamber between said conduits for conveying cold air from said cold air chamber therethrough to be heated and to said first mentioned hot-air chambers, means for conveying such heated air to the rooms to be heated, conduits of less cross sectional area than the secondary combustion chamber between said conduits for conducting cold air from the cold air chamber therethrough to be heated and to the second mentioned hot-air chambers, and means for conveying this latter heated air to the rooms to be heated.

14. In combination with a furnace having a fire pot and combustion chamber, an auxiliary heating device comprising a secondary combustion chamber, a conduit connecting the same to the combustion chamber of the furnace, a casing surrounding said secondary combustion chamber and separated therefrom at the sides and top, a cold air chamber below said secondary combustion chamber, and a plurality of open ended tubes extending from said cold air chamber through the secondary combustion chamber and opening into the space between the latter and the top of said casing.

15. The structure set forth in claim 8, a common base air chamber communicating with said casings, and passages connecting said last mentioned conduits with said common base air chamber.

In testimony whereof I affix my signature.

DEWITT A. BRUNETT.